(12) United States Patent
Ishikawa (10) Patent No.: US 7,354,170 B2
(45) Date of Patent: Apr. 8, 2008

(54) VEHICULAR MIRROR HAVING TILT ANGLE DETECTION ROD WITH SWING AXIS

(75) Inventor: Kaoru Ishikawa, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 0 days.

(21) Appl. No.: 11/338,886

(22) Filed: Jan. 25, 2006

(65) Prior Publication Data
US 2006/0181793 A1 Aug. 17, 2006

(30) Foreign Application Priority Data
Feb. 14, 2005 (JP) ............................. 2005-036470
Feb. 14, 2005 (JP) ............................. 2005-036471
Feb. 14, 2005 (JP) ............................. 2005-036472

(51) Int. Cl.
*G02B 7/198* (2006.01)
*B60R 1/072* (2006.01)
(52) U.S. Cl. ....................................... 359/874; 248/487
(58) Field of Classification Search ................ 359/877, 359/876, 874
See application file for complete search history.

(56) References Cited

U.S. PATENT DOCUMENTS

| | | | | |
|---|---|---|---|---|
| 4,678,295 A | * | 7/1987 | Fisher | ..................... 359/874 |
| 6,037,689 A | * | 3/2000 | Bingle et al. | ................... 310/89 |
| 6,094,027 A | * | 7/2000 | Willmore et al. | ............ 318/652 |
| 6,412,960 B1 | * | 7/2002 | Yoshida et al. | .............. 359/843 |
| 6,769,781 B2 | * | 8/2004 | Tsuyama | ..................... 359/874 |
| 2003/0086189 A1 | * | 5/2003 | Tsuyama et al. | ............. 359/872 |
| 2004/0047054 A1 | * | 3/2004 | Kikuchi | ...................... 359/877 |

* cited by examiner

*Primary Examiner*—Alessandro Amari
*Assistant Examiner*—Mark Consilvio
(74) *Attorney, Agent, or Firm*—Arent Fox LLP (57) ABSTRACT

In a vehicular mirror device, one end part of an operating shaft disposed on a side opposite to a drive shaft relative to a fulcrum of a mirror holder is swivelably coupled to the mirror holder, and a detection rod of a sensor is coupled to the operating shaft, which is slidably inserted into a guide hole provided in a fixed support member, so that it detects a swing angle of the mirror holder according to an axial position of the operating shaft. The operating shaft is inserted into the guide hole while being supported on the support member so that it can swing around an axis perpendicular to a plane containing a straight line linking a part of the drive shaft that couples the drive shaft to the mirror holder, the fulcrum of the mirror holder, and a part of the operating shaft that couples the operating shaft to the mirror holder. The detection rod, which has an axis coaxial with the swing axis of the operating shaft, is coupled to the operating shaft so that the operating shaft can swing around the swing axis. Thus, the swing angle of the mirror holder can be detected with a high accuracy.

5 Claims, 11 Drawing Sheets

FIG.11

VEHICULAR MIRROR HAVING TILT ANGLE DETECTION ROD WITH SWING AXIS

RELATED APPLICATION DATA

The present invention is based upon Japanese priority application Nos. 2005-36470, 2005-36471 and 2005-36472, which are hereby incorporated in their entirety herein by reference.

BACKGROUND OF THE INVENTION

1. Field of the Invention

The present invention relates to a vehicular mirror device in which an axially movable drive shaft is coupled to a mirror holder swingably supported by a fulcrum disposed on a straight line perpendicular to the axis of the drive shaft, one end part of an operating shaft disposed on the straight line on a side opposite to the drive shaft relative to the fulcrum is swivelably coupled to the mirror holder, and a detection rod of a sensor fixed to a fixed support member is coupled to the operating shaft, which is slidably inserted into a guide hole provided in the support member so as to extend parallel to the drive shaft, so that it detects a swing angle of the mirror holder according to an axial position of the operating shaft.

2. Description of the Related Art

U.S. Pat. No. 6,094,027 discloses a vehicular mirror device in which a detection rod of a sensor fixed to a support member is coupled to an operating shaft having one end mounted on a mirror holder, and a swing angle of the mirror holder is detected by detecting an axial position of the operating shaft.

In the arrangement disclosed in U.S. Pat. No. 6,094,027, the sensor is fixedly disposed in an attitude at an inclination of 45 degrees relative to a straight line linking a part of a drive shaft that couples the drive shaft to the mirror holder, the fulcrum of the mirror holder, and a part of the operating shaft that couples the operating shaft to the mirror holder. The part of the operating shaft that couples the operating shaft to the mirror holder moves in a direction along the above-mentioned straight line by an amount allowed in a gap between an inner face of a guide hole and an outer face of the operating shaft in response to swing of the mirror holder, and the operating shaft swings within the guide hole by this amount. Therefore, in this conventional structure in which the sensor is fixedly disposed in an attitude at an inclination of 45 degrees relative to the straight line, a force is exerted on the detection rod of the sensor from a direction at an inclination of 45 degrees, so that the position of the detection rod becomes uncertain, and consequently the accuracy of detection of the axial position of the operating shaft by the sensor becomes unstable, thus resulting in a deteriorated accuracy of the sensor in detecting the swing angle of the mirror holder.

SUMMARY OF THE INVENTION

The present invention has been accomplished under such circumstances, and it is an object thereof to provide a vehicular mirror device that enables the swing angle of a mirror holder to be detected with high accuracy.

In order to achieve the above object, according to a first feature of the present invention, there is provided a vehicular mirror device in which an axially movable drive shaft is coupled to a mirror holder swingably supported by a fulcrum disposed on a straight line that is perpendicular to the axis of the drive shaft, one end part of an operating shaft disposed on the straight line on a side opposite to the drive shaft relative to the fulcrum is swivelably coupled to the mirror holder, and a detection rod of a sensor fixed to a fixed support member is coupled to the operating shaft, which is slidably inserted into a guide hole provided in the support member so as to extend parallel to the drive shaft, so that the detection rod detects a swing angle of the mirror holder according to an axial position of the operating shaft, wherein the operating shaft is inserted into the guide hole while being supported by the support member so that the operating shaft can swing around an axis that is perpendicular to a plane containing the straight line and an axis of the operating shaft, and wherein the detection rod having an axis that is coaxial with the swing axis of the operating shaft is coupled to the operating shaft so that the operating shaft can swing around the axis of the detection rod.

With the arrangement of the first feature, the part of the operating shaft that couples the operating shaft to the mirror holder moves, in response to swing of the mirror holder, in a direction along the straight line linking the part of the drive shaft that couples the drive shaft to the mirror holder, the fulcrum of the mirror holder, and the part of the operating shaft that couples the operating shaft to the mirror holder. Therefore, the operating shaft swings around an axis that is perpendicular to a plane containing the above-mentioned straight line. However, since the detection rod has the axis coaxial with the swing axis of the operating shaft and is coupled to the operating shaft so that the operating shaft can swing around the axis of the detection rod, the position of the detection rod can be stably maintained at a position corresponding to the axial position of the operating shaft regardless of swing of the operating shaft within the guide hole. Thus, it is possible to stabilize the accuracy of the sensor in detecting the axial position of the operating shaft, thereby enhancing the accuracy of the sensor in detecting the swing angle of the mirror holder.

According to a second feature of the present invention, in addition to the first feature, a sensor case of the sensor, which comprises the detection rod extending in a direction perpendicular to the axis of the operating shaft, is fixed to the support member whose position relative to an actuator case that incorporates a drive means axially driving the drive shaft does not change; in order to detect by means of the sensor, a swing angle of the mirror holder according to the axial position of the operating shaft, a tip of the detection rod is coupled to another end part of the operating shaft by fitting them together by axially pushing the operating shaft against the detection rod in a state in which the detection rod is stationary; and a stopper that abuts against the tip of the detection rod so as to determine a limit of movement of the detection rod on a side opposite to the mirror holder is provided on the support member.

With the arrangement of the second feature, when the tip of the detection rod is fitted into and coupled to the other end part of the operating shaft, the operating shaft can be axially pushed against the detection rod in a state in which the detection rod is made stationary by making the tip abut against the stopper, and in this process, since the tip of the detection rod is received by the stopper, no bending stress is exerted on the detection rod from the operating shaft side. Furthermore, also when abnormal external force acts on the mirror holder and the operating shaft moves beyond a specified value, since the tip of the detection rod is received by the stopper, no bending stress is exerted on the detection rod. Therefore, both in a case in which the tip of the detection rod is fitted into and coupled to the other end part of the operating shaft, and a case in which the operating shaft moves beyond a specified value, it is possible to prevent a bending stress from acting on the detection rod, thus reliably preventing deformation of the detection rod, and thereby avoiding a degradation in the detection accuracy of the sensor.

According to a third feature of the present invention, in addition to the second feature, a slit-shaped coupling part is provided on said other end part of the operating shaft, which is made of a synthetic resin, the slit-shaped coupling part having a guide part that is formed so that its width decreases as it goes inward so that the width of the inner end is smaller than the outer diameter of the detection rod and the outer end is open, a mating part that is connected to the inner end of the guide part so that the detection rod fits into the mating part, and a channel part that has a width smaller than the diameter of the detection rod and is connected to the mating part.

With the arrangement of the third feature, by pushing the operating shaft against the detection rod in a state in which it is received by the stopper, the operating shaft can guide the tip of the detection rod smoothly from the guide part to the mating part and fit it into the mating part while elastically deforming so as to widen the width of the channel part, and the tip of the detection rod can easily be fitted into and coupled to the other end part of the operating shaft.

According to a fourth feature of the present invention, in addition to the second feature, the actuator case, which is fixed within a housing, comprises: a case main body as the support member, which is formed by integrally coupling via a coupling part a first housing part housing the drive means and a second housing part housing the sensor; a first lid member swingably supporting the mirror holder and covering the first housing part so as to make the drive shaft project; and a second lid member covering the second housing part so that the operating shaft can pass therethrough.

With the arrangement of the fourth feature, within the case main body, the first housing part housing the drive means and the first lid member covering the first housing part may have substantially the same shape as that of an actuator case of a vehicular mirror device having a function of only driving the mirror holder by visual remote operation. When molding the first lid member, by sharing and using a mold for molding the actuator case of the vehicular mirror device having the function of only driving the mirror holder by visual remote operation, the cost can be reduced. Moreover, since the first housing part housing the drive means and the second housing part housing the sensor are coupled as a unit via the coupling part, component precision control and adjustment can be made easy, and the number of assembly steps can be decreased.

The above-mentioned object, other object, features, and advantages of the present invention will become apparent from a preferred embodiment described in detail below in reference to the attached drawings.

DESCRIPTION OF THE PREFERRED EMBODIMENT

Figure 1:
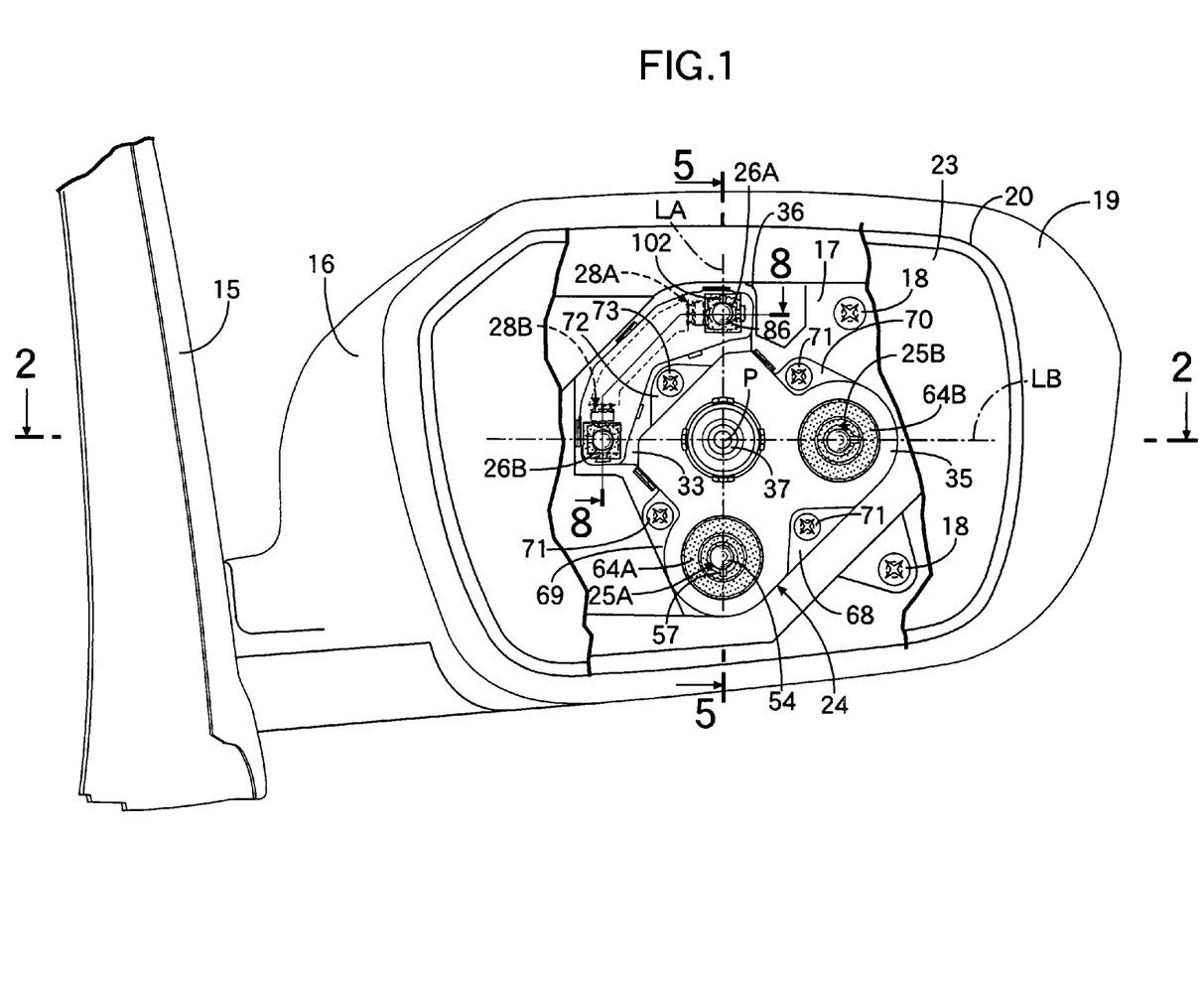
FIG. 1 is a partially cutout front view of a vehicular door mirror according to one embodiment of the present invention and is a view from arrowed line 1-1 in FIG. 2.
Figure 2:
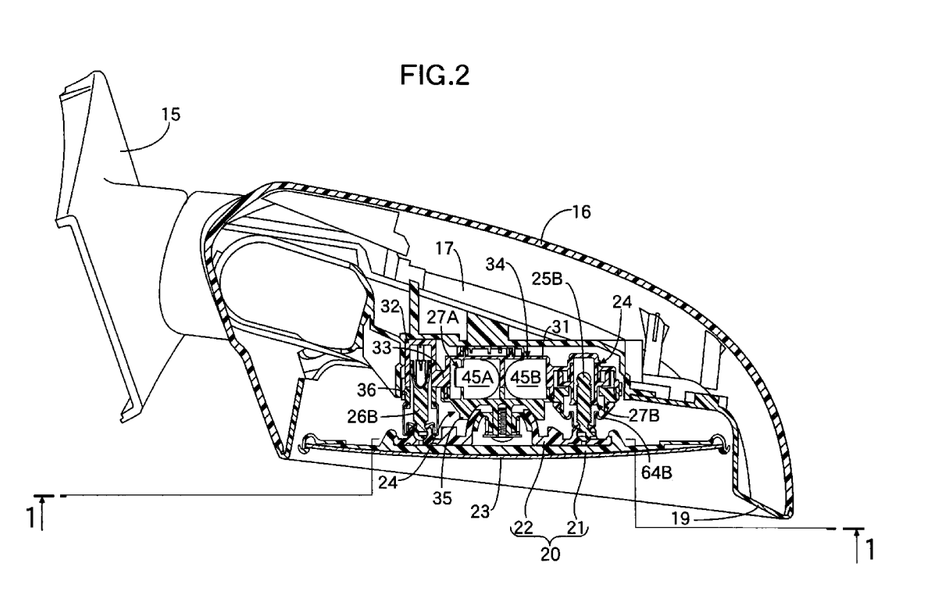
FIG. 2 is a sectional view along line 2-2 in FIG. 1.

One embodiment of the present invention is described below in reference to FIG. 1 to FIG. 11; referring first to FIG. 1 and FIG. 2, a base 15 is mounted on a side door of a vehicle, and a synthetic resin housing 16 is pivotably supported on the base 15 so that it can pivot to the front and rear of the vehicle.

A synthetic resin bracket 17 is pivotably supported on the base 15. The housing 16, which covers the bracket 17, is mounted on the bracket 17 via a plurality of screw members 18. A peripheral edge part of a visor 19 extending within the housing 16 and mounted on the housing 16 is connected to an open edge of the housing 16. A mirror 23 held by a mirror holder 20 is disposed within the visor 19 so as to enable viewing toward the rear of the vehicle.

The mirror holder 20 is formed from a holder main part 21 and an inner holder 22 fixed to an inner face side of the holder main part 21, the mirror 23 being mounted on an outer face side. The mirror holder 20 is supported by an actuator case 24 fixed to the bracket 17 so that the mirror holder 20 can swing to the front and rear and to the left and right.

The mirror holder 20 is swingably supported on the actuator case 24 at an intersection point P between a first straight line LA extending vertically and a second straight line LB extending horizontally. A pair of first and second drive shafts 25A and 25B project from the actuator case 24 in an axially movable manner so as to swing the mirror holder 20. A pair of first and second operating shafts 26A and 26B are coupled to the mirror holder 20.

The first drive shaft 25A has an axis perpendicular to the first straight line LA and is disposed beneath the intersection point P, and one end part of the first drive shaft 25A is coupled to the mirror holder 20 so that the first drive shaft 25A can swivel within a plane containing the first straight line LA. The second drive shaft 25B has an axis perpendicular to the second straight line LB and is disposed outside the intersection point P, and one end part of the second drive shaft 25B is coupled to the mirror holder 20 so that the second drive shaft 25B can swivel within a plane containing the second straight line LB. The first operating shaft 26A is disposed on the first straight line LA on a side opposite to the first drive shaft 25A relative to the intersection point P, and one end part of the first operating shaft 26A is coupled to the mirror holder 20 so that the first operating shaft 26A can swivel within a plane containing the first straight line LA. The second operating shaft 26B is disposed on the second straight line LB on a side opposite to the second drive shaft 25B relative to the intersection point P, and one end part of the second operating shaft 26B is coupled to the mirror holder 20 so that the second operating shaft 26B can swivel within a plane containing the second straight line LB.

A distance between the intersection point P and a part of the first drive shaft 25A that couples the first drive shaft 25A to the mirror holder 20 is set to be identical to a distance between the intersection point P and a part of the second drive shaft 25B that couples the second drive shaft 25B to the mirror holder 20. A distance between the intersection point P and a part of the first operating shaft 26A that couples the first operating shaft 26A to the mirror holder 20 is set to be identical to a distance between the intersection point P and a part of the second operating shaft 26B that couples the second operating shaft 26B to the mirror holder 20. Moreover, in this embodiment, the distances between the intersection point P and the part of the first drive shaft 25A that couples the first drive shaft 25A to the mirror holder 20, the part of the second drive shaft 25B that couples the second drive shaft 25B to the mirror holder 20, the part of the first operating shaft 26A that couples the first operating shaft 26A to the mirror holder 20, and the part of the second operating shaft 26B that couples the second operating shaft 26B to the mirror holder 20 are all identical to each other, thereby allowing the same inner holder 22 to be used for left and right mirror holders 20.

The actuator case 24 includes first drive means 27A for axially driving the first drive shaft 25A, second drive means 27B for axially driving the second drive shaft 25B, a first sensor 28A for detecting swing angles, within a plane containing the first straight line LA, of the mirror holder 20 and the mirror 23 according to the axial position of the first operating shaft 26A, and a second sensor 28B for detecting swing angles, within a plane containing the second straight line LB, of the mirror holder 20 and the mirror 23 according to the axial position of the second operating shaft 26B.

Figure 4:
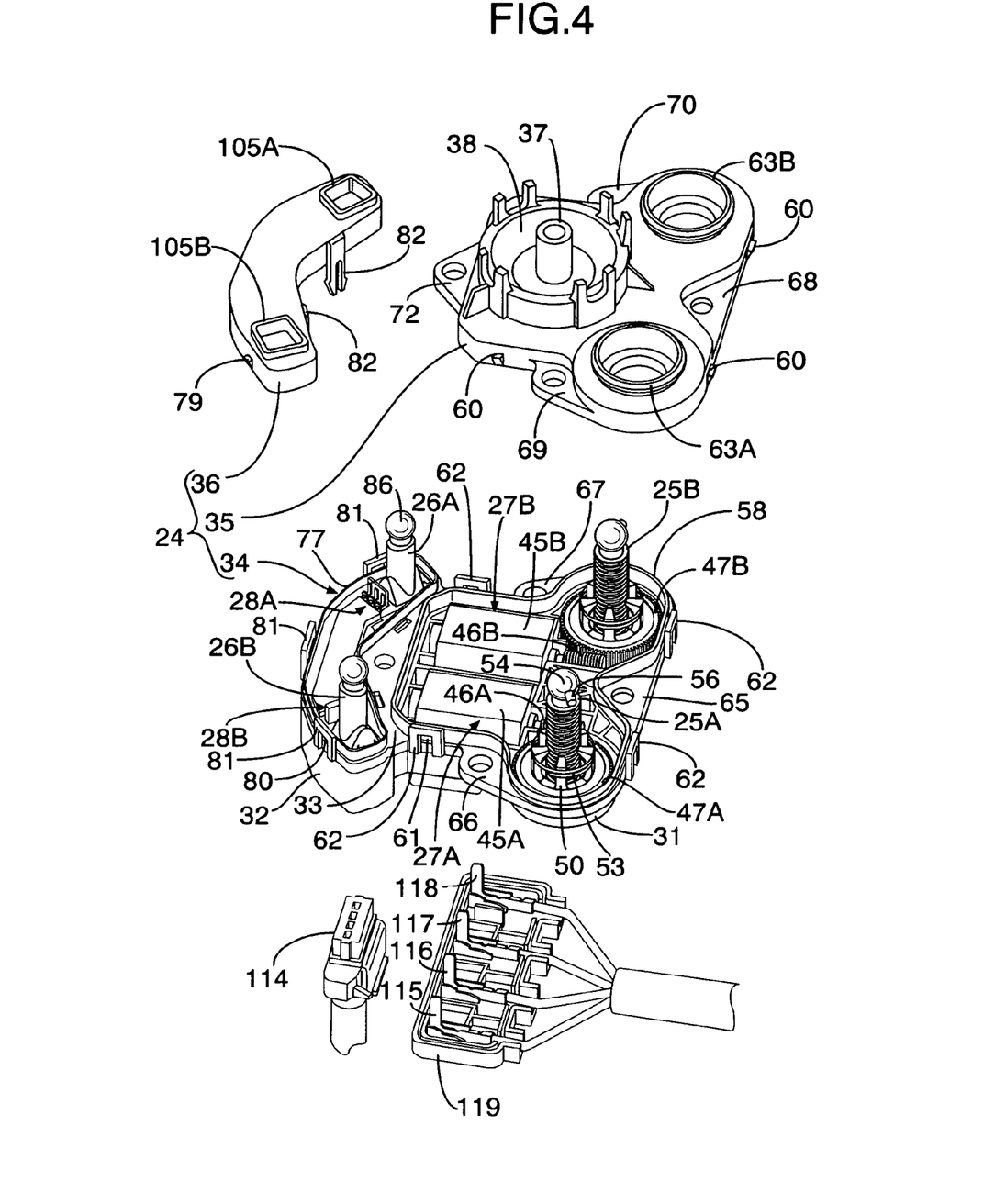
FIG. 4 is an exploded perspective view of the actuator case, a drive means connector and a sensor connector

Referring in addition to FIG. 4, the actuator case 24 comprises a case main body 34, a synthetic resin first lid member 35 and a synthetic resin second lid member 36. The case main body 34 is a synthetic resin support member formed by integrally coupling a first housing part 31 housing the first and second drive means 27A and 27B to a second housing part 32 housing the first and second sensors 28A and 28B via a coupling part 33. The synthetic resin first lid member 35 swingably supports the mirror holder 20 and covers the first housing part 31 from the mirror holder 20 side while allowing the first and second drive shafts 25A and 25B to project. The synthetic resin second lid member 36 covers the second housing part 32 from the mirror holder 20 side so that the first and second operating shafts 26A and 26B can pass through.

Figure 5:
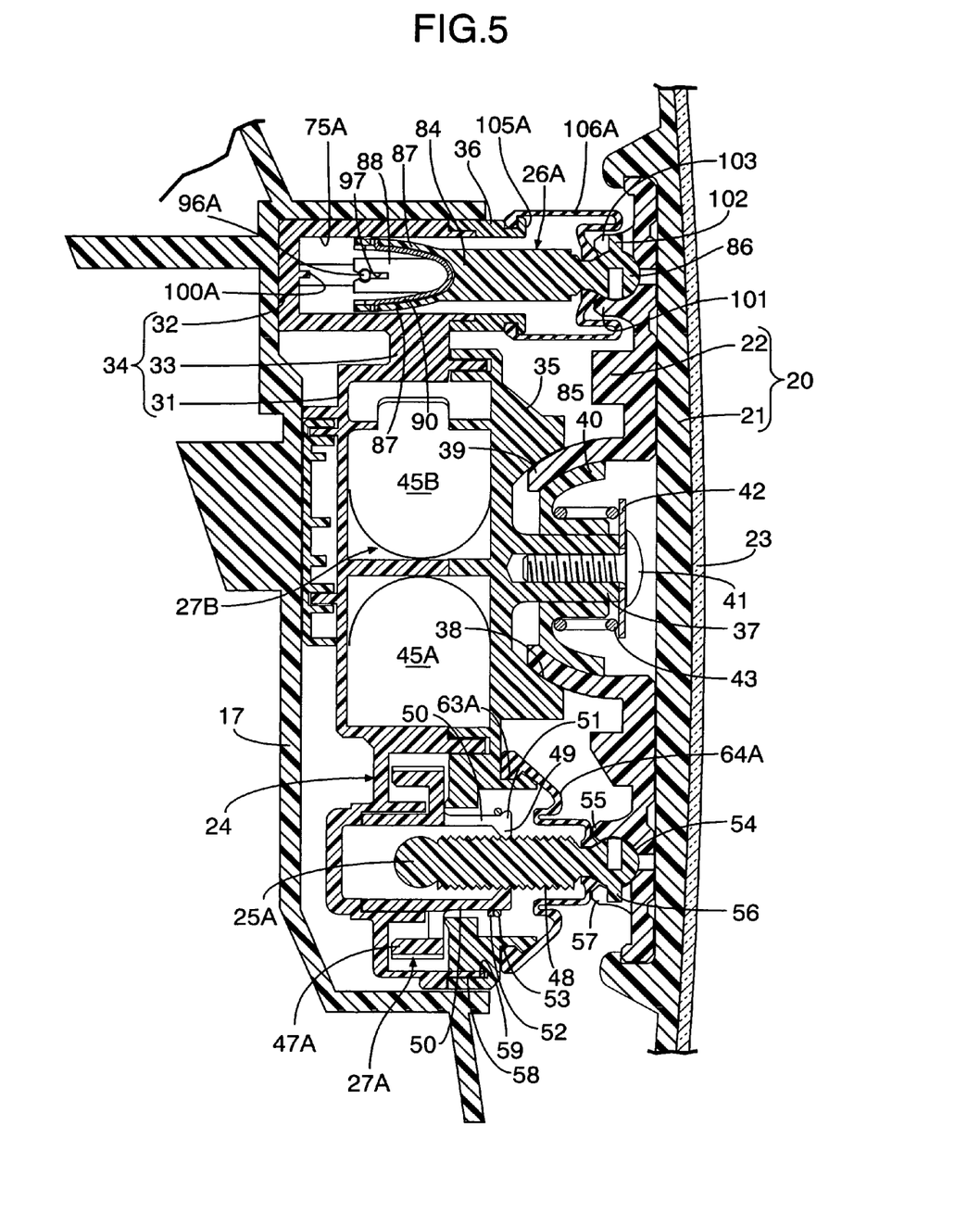
FIG. 5 is an enlarged sectional view along line 5-5 in FIG. 1

Referring in addition to FIG. 5, a cylindrical support shaft 37 is projectingly provided integrally with an outer face of the first lid member 35 so that the axis of the support shaft 37 is positioned on the intersection point P of the first and second straight lines LA and LB, and a support seat face 38 having an arc-shaped section and facing the mirror holder 20 side is provided so as to surround the support shaft 37. A receiving part 39 is provided integrally with the inner holder 22 of the mirror holder 20, the receiving part 39 having an outer face and an inner face formed so as to have arc-shaped sections with the same center as that of the arc-shaped section of the support seat face 38, and the outer face of the receiving part 39 is in sliding contact with the support seat face 38. Furthermore, a clamping member 40 having an outer face that has an arc-shaped section and is in sliding contact with the inner face of the receiving part 39 is axially movably mounted on the support shaft 37, which projects into the interior of the receiving part 39. A spring 43 is provided under compression between the clamping member 40 and a retainer 42 fixed to the tip of the support shaft 37 via a screw member 41, the spring 43 urging the clamping member 40 in a direction in which the receiving part 39 is clamped between the support seat face 38 and the clamping member 40.

In this way, the inner holder 22, which forms part of the mirror holder 20, is swingably supported on the first lid member 35 of the actuator case 24 so that the receiving part 39 is in sliding contact with the support seat face 38.

The first drive means 27A is formed from an electric motor 45A, a worm gear 46A provided on an output shaft of the electric motor 45A, and a worm wheel 47A that meshes with the worm gear 46A and is screwed around the first drive shaft 25A.

The worm wheel 47A is formed so as to coaxially surround the first drive shaft 25A and is rotatably supported on the first housing part 31. A male thread 48 is provided by cutting in an outer face of the first drive shaft 25A. A plurality of, for example, five arm parts 50 having, at the tip, internal teeth 49 screwed onto the male thread 48 are provided integrally with the worm wheel 47A at equal intervals in the peripheral direction. Outwardly projecting projections 51 are provided at the tip of some of the arm parts 50. Outwardly projecting projections 52 are provided on an outer face, close to the tip, of the rest of the arm parts 50. A spring 53 is wound around all the arm parts 50 between the projections 51 and 52 so that axial movement of the spring 53 is inhibited. By virtue of the spring force of the spring 53, the internal teeth 49 at the tip of the arm parts 50 are screwed onto the male thread 48 of the first drive shaft 25A.

Furthermore, a spherical head part 54 is provided integrally with one end part of the first drive shaft 25A, and this spherical head part 54 is swivelably fitted into a bearing part 55 provided on the inner holder 22 of the mirror holder 20. Moreover, an engagement projection 56 is projectingly provided on the spherical head part 54 along the first straight line LA, and the spherical head part 54 is fitted into the bearing part 55 so that the engagement projection 56 engages with a latching slit 57 provided in the bearing part 55. Therefore, said one end part of the first drive shaft 25A is coupled to the inner holder 22 of the mirror holder 20 so that rotation around its axis is inhibited but it can swivel within a plane containing the first straight line LA.

The second drive means 27B is formed, with the same arrangement as for the first drive means 27A, from an electric motor 45B, a worm gear 46B provided on an output shaft of the electric motor 45B, and a worm wheel 47B that meshes with the worm gear 46B and is screwed onto the second drive shaft 25B. One end part of the second drive shaft 25B is coupled to the inner holder 22 of the mirror holder 20 so that rotation around its axis is inhibited but it can swivel within a plane containing the second straight line LB.

Figure 3:
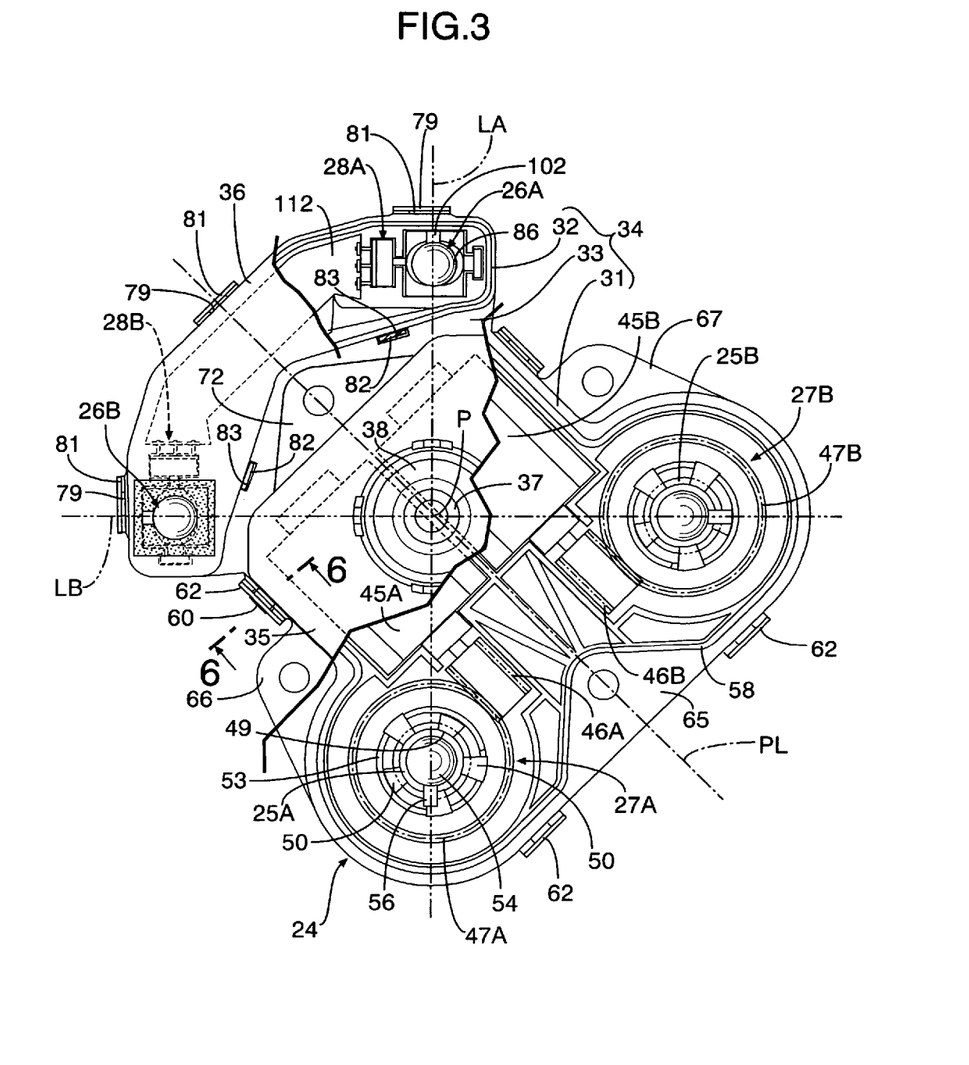
FIG. 3 is a partially cutout enlarged front view of an actuator case.

The first and second drive means 27A and 27B are housed in the first housing part 31 while being symmetrically relative to a plane PL passing through the intersection point P of the first and second straight lines LA and LB and passing through the midpoint between the first and second drive shafts 25A and 25B (see FIG. 3).

Figure 6:
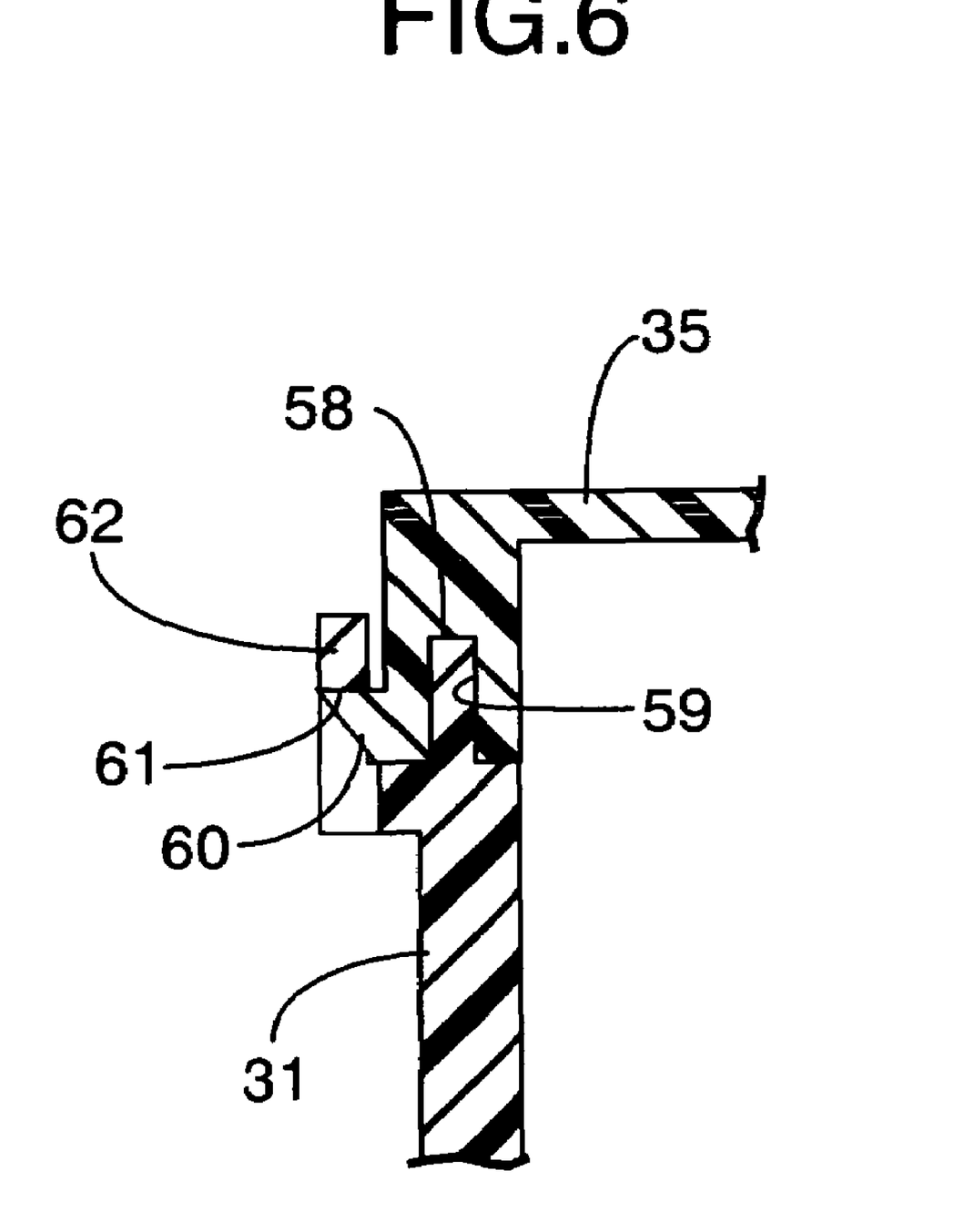
FIG. 6 is an enlarged sectional view along line 6-6 in FIG. 3

An endless mating wall part 58 is provided on the peripheral edge part of the first housing part 31 so as to project to the first lid member 35 side while surrounding the first and second drive means 27A and 27B. An endless mating groove 59 is provided on the peripheral edge part of the first lid member 35 so that the mating wall part 58 can be fitted into the mating groove 59. The first lid member 35, which covers the first housing part 31 so as to make the mating wall 58 fit into the mating groove 59, is resiliently engaged with the first housing part 31 at a plurality of, for example, four positions in the peripheral direction. That is, as shown in FIG. 6, engagement tabs 60 are projectingly provided at a plurality of, for example, four positions spaced in the peripheral direction of the first lid member 35, and latching parts 62 are provided integrally with portions of the first housing part 31 corresponding to the engagement tabs 60, the latching parts 62 being formed in a gantry shape so as to form latching holes 61 with which the engagement tabs 60 resiliently engage.

Cylindrical parts 63A and 63B are projectingly provided integrally with the first lid member 35 so as to face the mirror holder 20 side, the first and second drive shafts 25A and 25B projecting through the cylindrical parts 63A and 63B. Opposite end parts of boots 64A and 64B are fitted onto outer peripheral parts of the cylindrical parts 63A and 63B and onto outer peripheral parts, close to said one end, of the first and second drive shafts 25A and 25B, the boots 64A and 64B surrounding the first and second drive shafts 25A and 25B.

An outwardly protruding collar 65 is provided on the outer peripheral part of the first housing part 31 in a section between the worm wheels 47A and 47B of the first and second drive means 27A and 27B. Collars 66 and 67 are provided in sections outside the electric motors 45A and 45B of the first and second drive means 27A and 27B. Collars 68, 69, and 70 are provided on the first lid member 35, the collars 68, 69, and 70 being superimposed on the collars 65 to 67 respectively, and the superimposed collars 65 to 67 and 68 to 70 are each secured to the bracket 17 via screw members 71.

Furthermore, a collar 72 is provided integrally with the first lid member 35 so as to correspond to the coupling part 33 which couples the first and second housing parts 31 and 32, the collar 72 being superimposed on the coupling part 33. The superimposed collar 72 and coupling part 33 are secured to the bracket 17 via a screw member 73.

Figure 7:
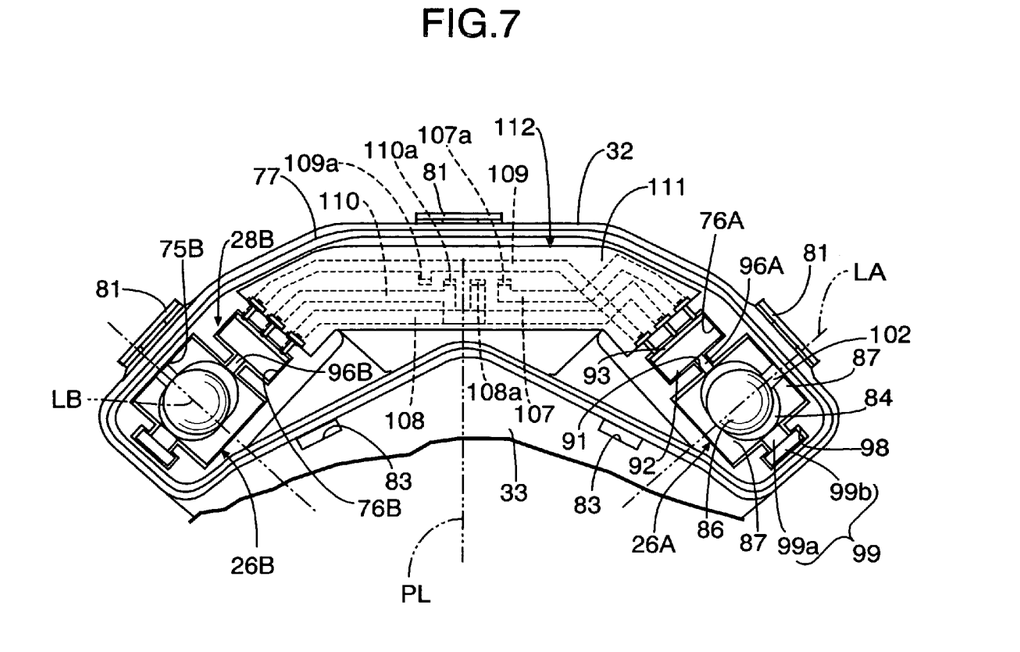
FIG. 7 is an enlarged front view of a second housing part
Figure 8:
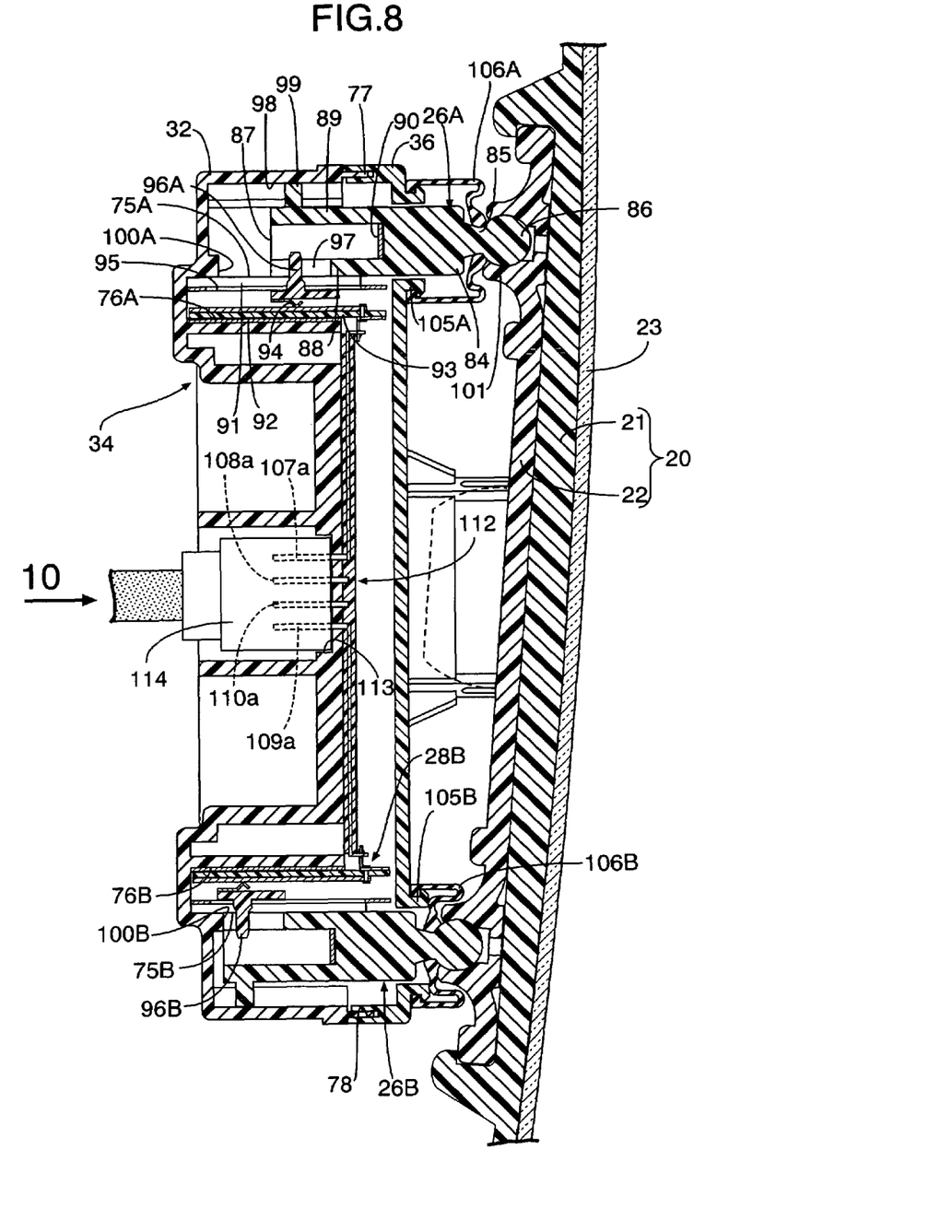
FIG. 8 is an enlarged sectional view along line 8-8 in FIG. 1

In FIG. 7 and FIG. 8, bottomed guide holes 75A and 75B having a rectangular section and having one closed end on a side opposite to the second lid member 36 are provided on the second housing part 32 so that the first and second operating shafts 26A and 26B can be slidably inserted into the guide holes 75A and 75B; and bottomed mounting holes 76A and 76B having a rectangular section and having a closed side opposite to the second lid member 36 are provided at positions adjacent to the guide holes 75A and 75B so that the first and second sensors 28A and 28B can be fixedly inserted into the mounting holes 76A and 76B.

An endless mating wall part 77 is provided on a peripheral edge part of the second housing part 32 so as to project to the second lid member 36 side. An endless mating groove 78 is provided on a peripheral edge part of the second lid member 36 so that the mating wall part 77 can be fitted into it. The second lid member 36, which covers the second housing part 32 so that the mating wall 77 fits into the mating groove 78, resiliently engages with the second housing part 32 at a plurality of, for example, five positions in the peripheral direction.

That is, a plurality of, for example, three mutually spaced-apart engagement tabs 79 are projectingly provided on a side face of the second lid member 36 on the side opposite to the first lid member 35, and latching parts 81 are provided integrally with sections of the second housing part 32 corresponding to the engagement tabs 79, the latching parts 81 being formed in a gantry shape so as to form latching holes 80 with which the engagement tabs 79 resiliently engage (see FIG. 4).

Furthermore, a plurality of, for example, two engagement tabs 82 are provided integrally with a side face of the second lid member 36 on the first lid member 35 side, the engagement tabs 82 having a bifurcated tip and extending toward the second housing part 32 side, and these engagement tabs 82 are inserted through latching holes 83 provided in the coupling part 33 so as to resiliently engage with the coupling part 33.

The first operating shaft 26A integrally includes: an operating shaft main part 84 having a cross-sectional shape that is basically rectangular but has rounded corners; a spherical head part 86 connected to one end of the operating shaft main part 84 via a neck part 85; a pair of curved sliding contact parts 87 that bifurcate within a plane containing the first straight line LA, are connected to the other end of the operating shaft main part 84, and are curved so that the gap therebetween widens as they go away from the operating shaft main part 84; and a pair of leg parts 88 and 89 that bifurcate within a plane perpendicular to the first straight line LA and are connected to said other end of the operating shaft main part 84.

The other end of the first operating shaft 26A is inserted into the guide hole 75A. The two curved sliding contact parts 87 are in resilient sliding contact with mutually opposing inner faces of the guide hole 75A due to the spring force of a leaf spring 90 attached to inner faces of the curved sliding contact parts 87.

The mounting hole 76A is provided on the second housing part 32 so as to adjoin the inner side of the guide hole 75A. A slit 91 extending in the longitudinal direction of the guide hole 75A and the mounting hole 76A is provided in a dividing wall between the guide hole 75A and the mounting hole 76A.

The sensor 28A, which is fixedly inserted into the mounting hole 76A, is a linear potentiometer; it is arranged so that a brush 94 slides on a substrate 93 that is fixedly housed within a metal sensor case 92 and is provided with a resistor, a detection rod 96A is provided so as to be connected to the brush 94, the detection rod 96A extending in a direction perpendicular to a plane containing the first straight line LA and perpendicular to the axis of the first operating shaft 26A. The detection rod 96A is inserted into an opening 95 provided in the sensor case 92 so as to face the slit 91 side.

The tip of the detection rod 96A is coupled to said other end part of the first operating shaft 26A by fitting them together by axially pushing the first operating shaft 26A against the detection rod 96A in a state in which the detection rod 96A is stationary.

Figure 9:
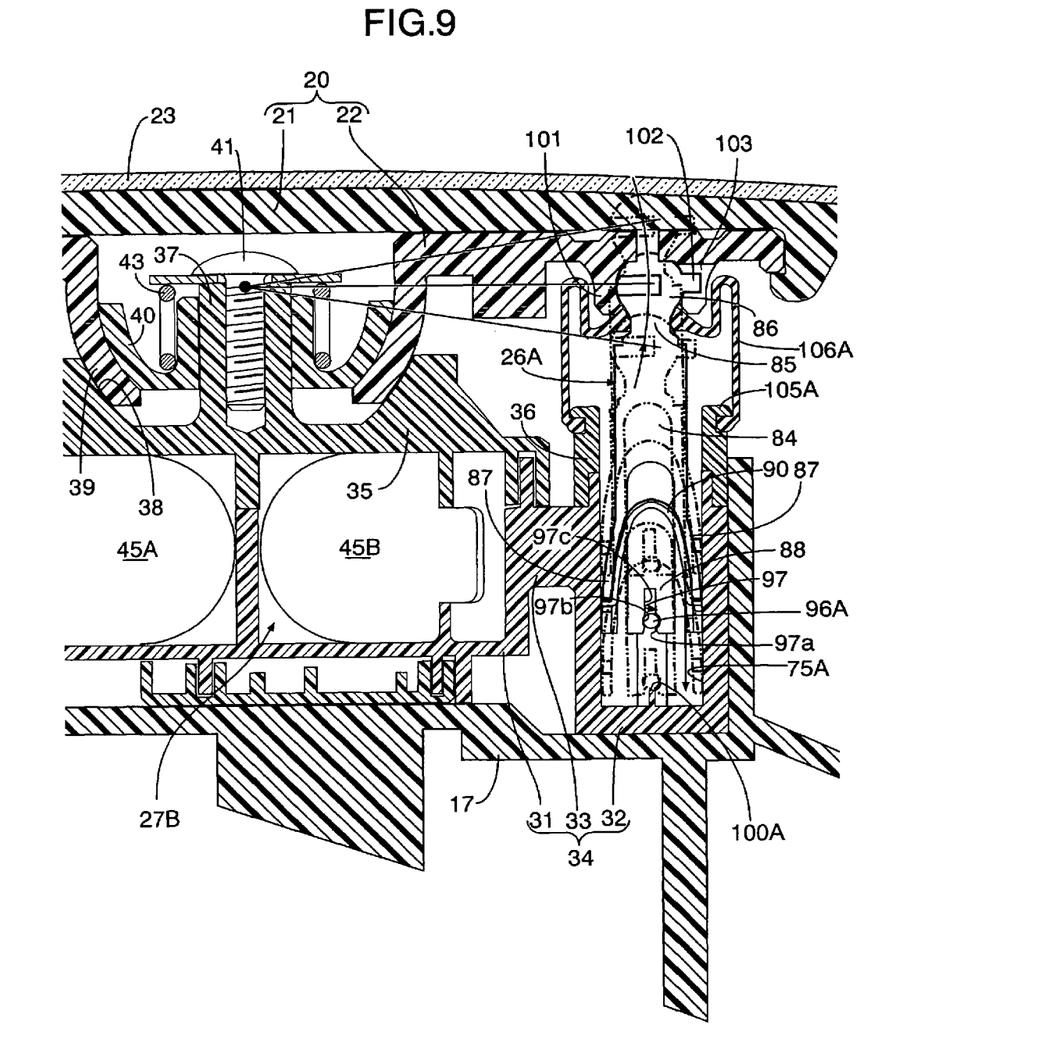
FIG. 9 is a sectional view for explaining movement of an operating shaft according to swing of a mirror holder.

In FIG. 9, in order to couple the tip of the detection rod 96A, the leg part 88 on said other end of the first operating shaft 26A is provided with a slit-shaped coupling part 97 extending in a direction along the axis of the first operating shaft 26A. The coupling part 97 comprises: a guide part 97*a*, which is formed with its width decreasing as it goes inward so that the width of the inner end is smaller than the diameter of the detection rod 96A and the outer end is open; a circular mating part 97*b* connected to the inner end of the guide part 97*a* so that the detection rod 96A fits into the mating part 97*b*; and a channel part 97*c* connected to the mating part 97*b* so as to have a width smaller than the diameter of the detection rod 96A.

A dovetail groove 98 having a substantially T-shape in section and open on an inner face of the guide hole 75A is provided on the second housing part 32 on a side opposite to the sensor 28A. A substantially T-shaped guide projection 99 comprises a shaft portion 99a which is coaxial with the detection rod 96A in a state in which it is fitted into the mating part 97b, and an engagement portion 99b connected to the tip of the shaft portion 99a, and is projectingly provided integrally with the leg part 89 on said other end of the first operating shaft 26A.

The first operating shaft 26A is thereby slidably inserted into the guide hole 75A, while being supported on the second housing part 32 so as to swing around the axis of the detection rod 96A and the shaft portion 99a of the guide projection 99 which are coaxial with each other and perpendicular to a plane containing the first straight line LA and the axis of the first operating shaft 26A; and the detection rod 96A having an axis coaxial with the swing axis of the first operating shaft 26A is coupled to the first operating shaft 26A so that the first operating shaft 26A can swing around the swing axis.

Furthermore, a stopper 100A is projectingly provided integrally with the second housing part 32 so as to project from the closed end of the guide hole 75A so that the stopper 100A can be fitted into the guide part 97a of the coupling part 97, the stopper 100A defining a limit of movement of the detection rod 96A on a side opposite to the mirror holder 20 by abutting against the tip of the detection rod 96A.

The spherical head part 86 at said one end of the first operating shaft 26A is swivelably fitted into a bearing part 101 provided on the inner holder 22 of the mirror holder 20. Moreover, the spherical head part 86 is provided with an engagement projection 102 extending along the first straight line LA. The spherical head part 86 is fitted into the bearing part 101 so that the engagement projection 102 engages with a latching slit 103 provided in the bearing part 101. Therefore, said one end part of the first operating shaft 26A is coupled to the inner holder 22 of the mirror holder 20 so that rotation around its axis is inhibited but it can swivel within the plane containing the first straight line LA.

The second operating shaft 26B is slidably inserted into the guide hole 75B with the same arrangement as that of the first operating shaft 26A, the sensor 28B is fixedly inserted into the mounting holes 76B with the same arrangement as that of the sensor 28A, and the guide hole 75B and the mounting hole 76B are provided on the second housing part 32 at positions that are symmetrical to the guide hole 75A and the mounting hole 76A with respect to the plane PL running through the intersection point P between the first and second straight lines LA and LB and running through the midpoint between the first and second drive shafts 25A and 25B. Furthermore, one end part of the second operating shaft 26B is coupled to the inner holder 22 of the mirror holder 20 so that rotation around its axis is inhibited but it can swivel within a plane containing the second straight line LB. The second operating shaft 26B is inserted into the guide hole 75B while being supported on the second housing part 32 so that it can swing around an axis perpendicular to a plane containing the second straight line LB and the axis of the second operating shaft 26B. A detection rod 96B of the sensor 28B is coupled to the second operating shaft 26B so that the second operating shaft 26B can swing around an axis coaxial with the swing axis of the second operating shaft 26B. A stopper 100B is projectingly provided at a closed end of the guide hole 76B, the stopper 100B defining a limit of movement of the detection rod 96B on a side opposite to the mirror holder 20 by abutting against the tip of the detection rod 96B.

Tubular parts 105A and 105B having a rectangular cross section are provided integrally with the second lid member 36 so as to project to the mirror holder 20 side, the tubular parts 105A and 105B having the first and second operating shafts 26A and 26B projecting therethrough. Opposite end parts of boots 106A and 106B surrounding the first and second operating shafts 26A and 26B are fitted onto the outer peripheries of the tubular parts 105A and 105B and onto the outer peripheries, close to said one end, of the first and second operating shafts 26A and 26B.

A bus bar assembly 112 is disposed on the second housing part 32 between the sensors 28A and 28B, the bus bar assembly 112 being formed by covering, with a synthetic resin covering part 111, bus bars 107 and 108 connected to output terminals of the two sensors 28A and 28B, a bus bar 109 connected in common to power terminals of the two sensors 28A and 28B, and a bus bar 110 connected in common to ground terminals of the two sensors 28A and 28B. Furthermore, a recess 113 is provided on a face of the second housing part 32 on a side opposite to the second lid member 36, and connection terminals 107a, 108a, 109a, and 110a formed by bending a part of the bus bars 107 to 110 are disposed so as to face the recess 113.

Figure 10:
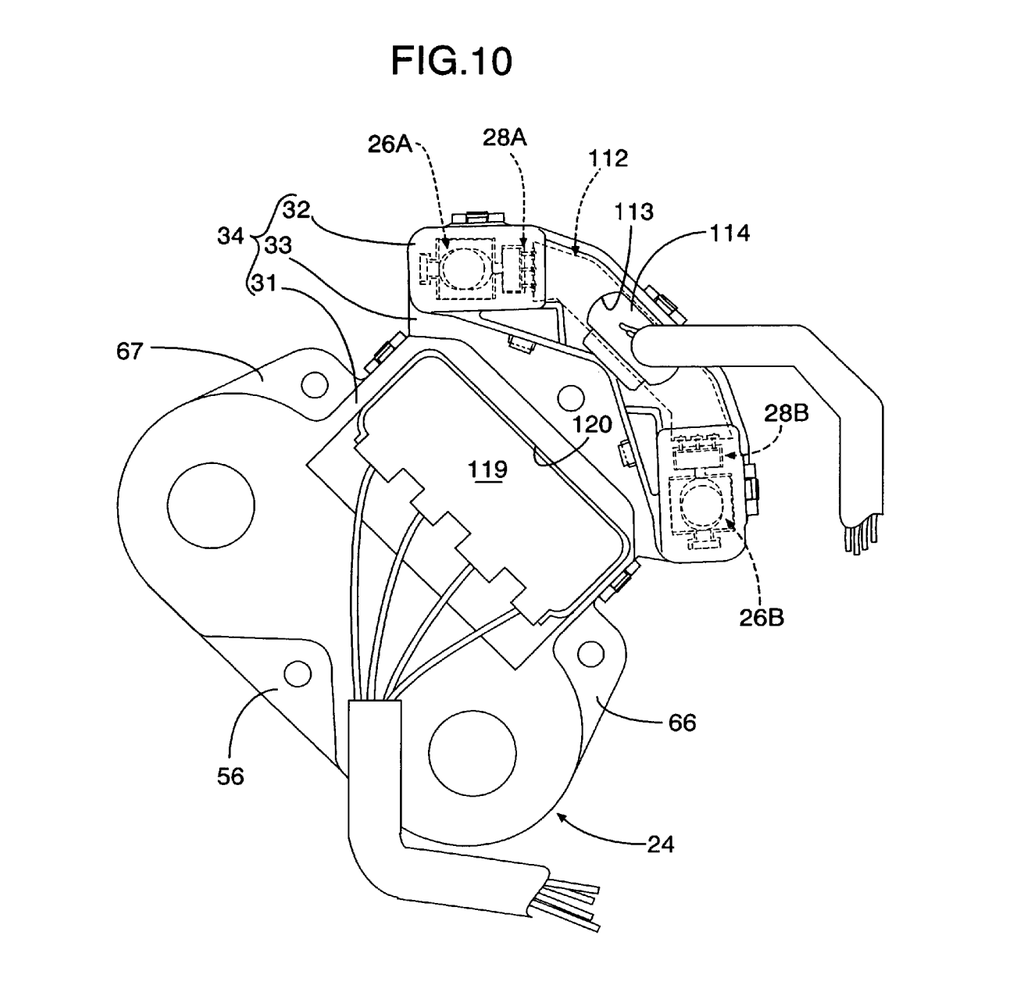
FIG. 10 is a view from arrow 10 in FIG. 8.

Referring in addition to FIG. 10, a sensor connector 114 having terminals connected to the connection terminals 107a to 110a is detachably fitted into the recess 113. A recess 120 is provided on a face of the first housing part 31 on a side opposite to the first lid member 35. A drive means connector 119 having a pair of connection terminals 115 and 116 connected to the electric motor 45A and a pair of connection terminals 117 and 118 connected to the electric motor 45B is detachably fitted into the recess 120.

The operation of this embodiment is now described. The actuator case 24 comprises: the case main body 34, which is formed by integrally coupling the first and second housing parts 31 and 32 via the coupling part 33; the first lid member 35 covering the first housing part 31; and the second lid member 36 covering the second housing part 32. The first housing part 31 houses the first and second drive means 27A and 27B for individually and axially driving the first and second drive shafts 25A and 25B, which have end parts swivelably coupled to the mirror holder 20. The second housing part 32 houses the first and second sensors 28A and 28B for detecting the axial positions of the first and second operating shafts 26A and 26B, which have end parts swivelably coupled to the mirror holder 20, that is, the swing angle of the mirror holder 20. The first lid member 35 covers the first housing part 31 so as to make the first and second drive shafts 25A and 25B project. The second lid member 36 covers the second housing part 32 so as to allow the first and second operating shafts 26A and 26B to pass therethrough.

Figure 11:
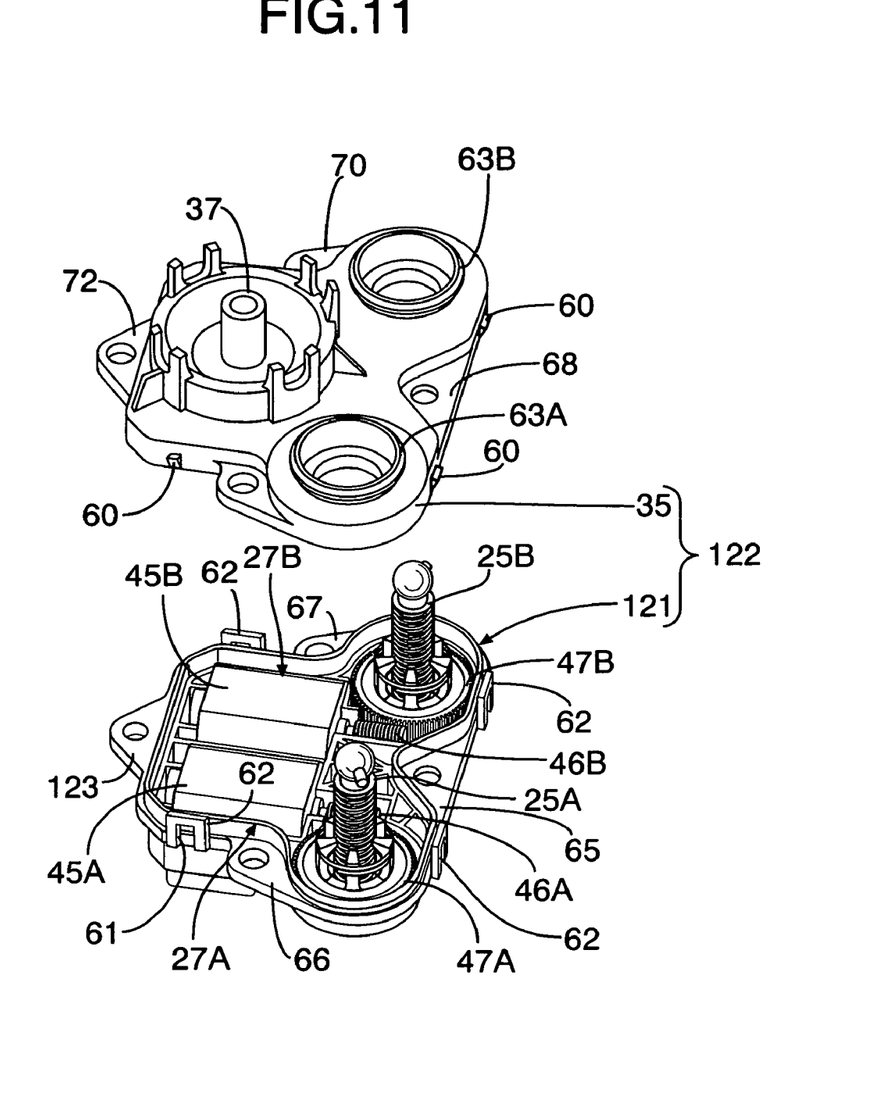
FIG. 11 is a perspective view for explaining application to an actuator case in which a sensor is made unnecessary.

As shown in FIG. 11, a door mirror actuator case 122 having a function of only driving a mirror holder by visual remote operation can be formed from a case main body 121 housing first and second drive means 27A and 27B and a lid member 35 covering the case main body 121. The first lid member 35 of the actuator case 24 can be commonly used as the actuator case 122 having such an arrangement.

That is, the first lid member 35 can be used in common as the actuator case 122 because the case main body 121 is formed into a shape substantially corresponding to the first housing part 31 so as to have a collar 123 corresponding to the collar 72 of the first lid member 35; and when molding the first lid member 35, the cost can be reduced by sharing and using a mold for molding the actuator case 122 of the vehicular mirror device having a function of only driving the mirror holder by visual remote operation.

Moreover, since the first housing part 31 housing the first and second drive means 27A and 27B and the second housing part 32 housing the first and second sensors 28A and 28B are coupled integrally to each other via the coupling part 33, it becomes easy to control and adjust the component precision when increasing the relative dimensional precision between a swing fulcrum of the mirror holder 20 and operating sections of the two sensors 28A and 28B, and the number of assembly steps can be decreased.

The detection rods 96A and 96B of the sensors 28A and 28B fixed to the second housing part 32 of the case main body 34 are coupled to said other ends of the first and second operating shafts 26A and 26B, which have ends on said one side swivelably coupled to the mirror holder 20, by fitting them together by pushing the first and second operating shafts 26A and 26B against the detection rods 96A and 96B in a state in which the detection rods 96A and 96 are stationary, and the stoppers 100A and 100B are provided on the second housing part 32. The stoppers 100A and 100B defining the limit of movement of the detection rods 96A and 96B on the side opposite to the mirror holder 20 by abutting against the tips of the detection rods 96A and 96B.

Therefore, when coupling by fitting the tips of the detection rods 96A and 96B into said other end parts of the first and second operating shafts 26A and 26B, the first and second operating shafts 26A and 26B may be axially pushed against the detection rods 96A and 96B in a state in which the detection rods 96A and 96B are stationary due to the tips abutting against the stoppers 100A and 100B; and in this process, since the tips of the detection rods 96A and 96B are received by the stoppers 100A and 100B, no bending stress is exerted on the detection rods 96A and 96B from the first and second operating shafts 26A and 26B side. Also when an abnormal external force is exerted on the mirror holder 20 and the first and second operating shafts 26A and 26B move beyond a specified value, since the tips of the detection rods 96A and 96B are received by the stoppers 100A and 100B, no bending stress is exerted on the detection rods 96A and 96B. As a result, in both a state when the tips of the detection rods 96A and 96B are fitted into and coupled to said other end parts of the first and second operating shafts 26A and 26B, and a state when the first and second operating shafts 26A and 26B move beyond the specified value, it is possible to prevent a bending stress from being exerted on the detection rods 96A and 96B, thus reliably preventing deformation of the detection rods 96A and 96B and thereby avoiding any degradation in the detection accuracy of the sensors 28A and 28B.

Moreover, the slit-shaped coupling part 97 including the guide part 97a formed with its width decreasing as it goes inward so that the width of the inner end is smaller than the outer diameter of the detection rods 96A and 96B and the outer end is open, the mating part 97b connected to the inner end of the guide part 97a so that the detection rods 96A and 96B fit therein, and the channel part 97c that has a width smaller than the diameter of the detection rods 96A and 96B and is connected to the mating part 97b, is provided on the leg parts 88 that are provided, on said other end, on the first and second operating shafts 26A and 26B made of a synthetic resin, by pushing the first and second operating shafts 26A and 26B against the detection rods 96A and 96B received by the stoppers 100A and 100B. Therefore, the first and second operating shafts 96A and 96B can smoothly guide the tips of the detection rods 96A and 96B from the guide part 97a to the mating part 97b and make them fit into the mating part 97b while elastically deforming so as to widen the width of the channel part 97c, so that it becomes easy to carry out fitting and coupling of the tips of the detection rods 96A and 96B to said other end parts of the first and second operating shafts 26A and 26B.

Furthermore, the first and second operating shafts 26A and 26B are inserted into the guide holes 75A and 75B while being supported on the second housing part 32 of the case main body 34 so that they can swing around the axes perpendicular to the planes containing the first and second straight lines LA and LB and the axes of the first and second operating shafts 26A and 26B, and the detection rods 96A and 96B having the axes coaxial with the swing axes of the first and second operating shafts 26A and 26B are coupled to the first and second operating shafts 26A and 26B so that the first and second operating shafts 26A and 26B can swing around the swing axes.

Therefore, as shown in FIG. 9, when the part of the first operating shaft 26A that couples the first operating shaft 26A to the mirror holder 20 moves in the direction along the first straight line LA linking the part of the first drive shaft 25A that couples the first drive shaft 25A to the mirror holder 20, the fulcrum of the mirror holder 20, and the part of the first operating shaft 26A that couples the first operating shaft 26A to the mirror holder 20, the first operating shaft 26A moves within the guide hole 75A while swinging around the axis perpendicular to the plane containing the first straight line LA according to swing of the mirror holder 20. However, since the detection rod 96A has the axis coaxial with the swing axis of the first operating shaft 26A and is coupled to the first operating shaft 26A so that the first operating shaft 26A can swing around the swing axis, the position of the detection rod 96A can be maintained in a stable manner at a position corresponding to the axial position of the first operating shaft 26A regardless of swing of the first operating shaft 26A within the guide hole 75A. Therefore, it is possible to stabilize the accuracy of the sensor 28A in detecting the axial position of the first operating shaft 26A and improve the accuracy of the sensor 28A in detecting the swing angle of the mirror holder 20 within the plane containing the first straight line LA.

Furthermore, the second operating shaft 26B also moves within the guide hole 75B while swinging around the axis perpendicular to the plane containing the second straight line LB and the axis of the second operating shaft 26B according to swing of the mirror holder 20, and the detection rod 96B has the axis coaxial with the swing axis of the second operating shaft 26B and is coupled to the second operating shaft 26B so that the second operating shaft 26B can swing around the swing axis. Therefore, the position of the detection rod 96B can be maintained in a stable manner at a position corresponding to the axial position of the second operating shaft 26B regardless of swing of the second operating shaft 26B within the guide hole 75B, so that it is possible to stabilize the accuracy of the sensor 28B in detecting the axial position of the second operating shaft 26B and improve the accuracy of the sensor 28B in detecting the swing angle of the mirror holder 20 within the plane containing the second straight line LB.

Although an embodiment of the present invention has been described above, the present invention is not limited to the above-mentioned embodiment and can be modified in a variety of ways as long as the modifications do not depart from the present invention described in the claims.

What is claimed is:

1. A vehicular mirror device in which an axially movable drive shaft is coupled to a mirror holder swingably supported by a fulcrum disposed on a straight line that is perpendicular to the axis of the drive shaft, one end part of an operating shaft disposed on the straight line on a side opposite to the drive shaft relative to the fulcrum is swivelably coupled to the mirror holder, and a detection rod of a sensor, the sensor being fixed to a fixed support member, is coupled to the operating shaft, which is slidably inserted into a guide hole provided in the support member so as to extend parallel to the drive shaft, so that the detection rod detects a swing angle of the mirror holder according to an axial position of the operating shaft,  wherein the operating shaft is inserted into the guide hole while being supported by the support member so that the operating shaft can swing around a swing axis, that is coaxial with a guide projection on a leg part of the operating shaft, the swing axis being perpendicular to a plane containing the straight line and perpendicular to an axis along the longitudinal length of the operating shaft, and  wherein the detection rod having an axis that is coaxial with the swing axis of the operating shaft is coupled to the operating shaft so that the operating shaft can swing around the axis of the detection rod.

2. The vehicular mirror device according to claim 1, wherein a sensor case of the sensor, which comprises the detection rod extending in a direction perpendicular to the axis of the operating shaft, is fixed to the support member whose position relative to an actuator case that incorporates a drive means axially driving the drive shaft does not change;

wherein, in order to detect by means of the sensor, a swing angle of the mirror holder according to the axial position of the operating shaft, a tip of the detection rod is coupled to another end part of the operating shaft by fitting them together by axially pushing the operating shaft against the detection rod in a state in which the detection rod is stationary; and  wherein a stopper that abuts against the tip of the detection rod so as to determine a limit of movement of the detection rod on a side opposite to the mirror holder is provided on the support member.

3. The vehicular mirror device according to claim 2, wherein a slit-shaped coupling part is provided on said other end part of the operating shaft, which is made of a synthetic resin, the slit-shaped coupling part having a guide part that is formed so that its width decreases as it goes inward so that the width of the inner end is smaller than the outer diameter of the detection rod and the outer end is open, a mating part that is connected to the inner end of the guide part so that the detection rod fits into the mating part, and a channel part that has a width smaller than the diameter of the detection rod and is connected to the mating part.

4. The vehicular mirror device according to claim 2, wherein the actuator case, which is fixed within a housing, comprises:

a case main body as the support member, which is formed by integrally coupling via a coupling part, the case main body having a first housing part housing the drive means and a second housing part housing the sensor;

a first lid member swingably supporting the mirror holder and covering the first housing part so as to make the drive shaft project; and  a second lid member covering the second housing part so that the operating shaft can pass therethrough.

5. The vehicular mirror device according to claim 1, wherein the operating shaft comprises a shaft portion that extends along the swing axis and a slit-shaped coupling part, and the detection rod is coupled to the coupling part of the operating shaft at a position corresponding to the shaft portion in the axial direction of the operating shaft.

* * * * *